United States Patent [19]

Eaton et al.

[11] 4,420,369

[45] Dec. 13, 1983

[54] PROCESS FOR THE DECOLORIZATION OF PULP MILL BLEACH PLANT EFFLUENT

[75] Inventors: David C. Eaton, Frederick, Md.; Thomas K. Kirk, Verona, Wis.; Hou-min Chang, Raleigh, N.C.

[73] Assignee: The United States of America as represented by the Secretary of Agriculture, Washington, D.C.

[21] Appl. No.: 352,426

[22] Filed: Feb. 25, 1982

[51] Int. Cl.³ .............................................. D21C 11/00
[52] U.S. Cl. ..................................... 162/29; 210/711; 210/717; 210/723; 210/724; 210/928
[58] Field of Search ........... 162/29, 189, 190, DIG. 9; 210/928, 711, 717, 723, 724

[56] References Cited

U.S. PATENT DOCUMENTS 2,218,053  10/1940  Schwabe et al. .................. 210/928
3,627,679  12/1971  Fuller ................................ 162/29
3,740,363   6/1973  Fuller ................................ 162/29

FOREIGN PATENT DOCUMENTS 589807  12/1959  Canada .............................. 162/29

Primary Examiner—Peter Chin
Attorney, Agent, or Firm—M. Howard Silverstein; David G. McConnell

[57] ABSTRACT

Pulp mill bleach plant caustic extraction effluent is decolorized using a primary or other sludge from a pulp and paper mill. The sludge is acidified and mixed with the effluent. After a short incubation period, the mixture of acidified sludge and effluent is raised to at least neutral pH, causing precipitation of most of the color in the effluent. The precipitated color may then easily be separated from the liquor by any conventional clarification technique. The method avoids the consumption of large quantities of expensive reagents or high transportation costs associated with the prior art decolorization techniques used on such effluent.

10 Claims, 4 Drawing Figures

PROCESS FOR THE DECOLORIZATION OF PULP MILL BLEACH PLANT EFFLUENT

BACKGROUND OF THE INVENTION

This invention relates to a process for the decolorization of pulp mill bleach plant effluent.

The effluent from a pulp mill bleach plant contains highly colored lignin degradation products and is thus itself densely colored. Since pulp mill bleach plants produce very large quantities of this densely colored effluent (typically several thousand liters of such effluents are produced per ton of bleached paper product produced), the discharge of such large quantities of densely colored effluent into running water causes a highly objectionable discoloration of the water. Already-existing or future pollution control regulations will force pulp mill bleach plants to reduce the color in their effluent in the near future.

The lignin degradation products responsible for the color of the effluent are partially aromatic, polymeric materials very resistant to biological degradation. Although it is now known that certain bacteria can degrade lignin slowly, only the higher fungi can effect rapid degradation. Traditional biological waste treatement processes, which do not use higher fungi, are ineffective in removing color from pulp mill bleach plant effluents.

Conventional non-biological effluent treatment processes such as ultra-filtration, reverse osmosis, precipitation with lime or alum and carbon absorption are effective in removing color from such effluents, but are prohibitively expensive for use in treating the quantities of such effluents generated by commercial-sized plants because of the need for large amounts of chemical reagents, high maintainance costs and expensive facilities. To reduce these costs and to improve the effectiveness of chemical precipitation, it has been suggested that ferric chloride and lime be used together in such a precipitation method; see Dugal, Church, Leakley and Swanson, *Color Removal in A Ferric Chloride-Lime System*, Technical Association of Pulp and Paper Industry 59(9), 71(1976).

It has also been suggested that the effluent be decolorized by treating it with lignite coal fly ash acidified with chlorination stage effluent to solublize aluminum ions therefrom; see Bakhshi and MacDonald, *Colour Removal from Pulp Mill Effluents Using Fly Ash-Mini Pilot Plant Experience*, AICHE Symposium Series, Vol. 76, Lightsey (ed.), American Institute of Chemical Engineers, N.Y., (1980). This method only removes color when operated between pH 4.0 and pH 4.6 and has the serious disadvantage of requiring large quantities of the fly ash; although such fly ash, of course, readily available at coal-burning power plants, many pulp mills are situated in rather remote areas far distant from any such power plants and the transportation of fly ash to the pulp mills renders the method economically unattractive.

It is known that precipitation of the color from the effluent can be effected by lowering the pH of the effluent below about 1.5, see Sameshima and Kondo, *Study of the Color of Waste Liquor of Pulp Industry. I. The Relationship Between the Color of Waste Liquor in the Kraft Pulp Multistage Bleaching and the Isolated $Cl_2$-oxylignin*, Mokuzai Gakkaishi 16, 347 (1970), and U.S. Pat. No. 4,000,033 to Nicolle et al. This method has the disadvantage of requiring large quantities of acid and of producing a very acidic treated effluent, the disposal of which may be as difficult, if not more difficult, than that of the original colored effluent.

There is thus a need for a process for the decolorization of pulp mill bleach plant effluent which does not use large quantities of expensive chemical reagents, does not involve high transportation costs and which does not need extensive plant or extensive maintainance of such plant. This invention seeks to provide such a process.

SUMMARY OF THE INVENTION

The invention provides a process for the decolorization of pulp mill bleach plant effluent in which a sludge from a pulp and paper mill is acidified and the resulting acidified sludge is mixed with the effluent. The mixture of acidified sludge and effluent is then raised to at least neutral pH, thereby forming a precipitate containing at least part of the colored material from the effluent, and this precipitate is separated from the accompanying liquid.

DETAILED DESCRIPTION OF THE INVENTION

Figure 1:
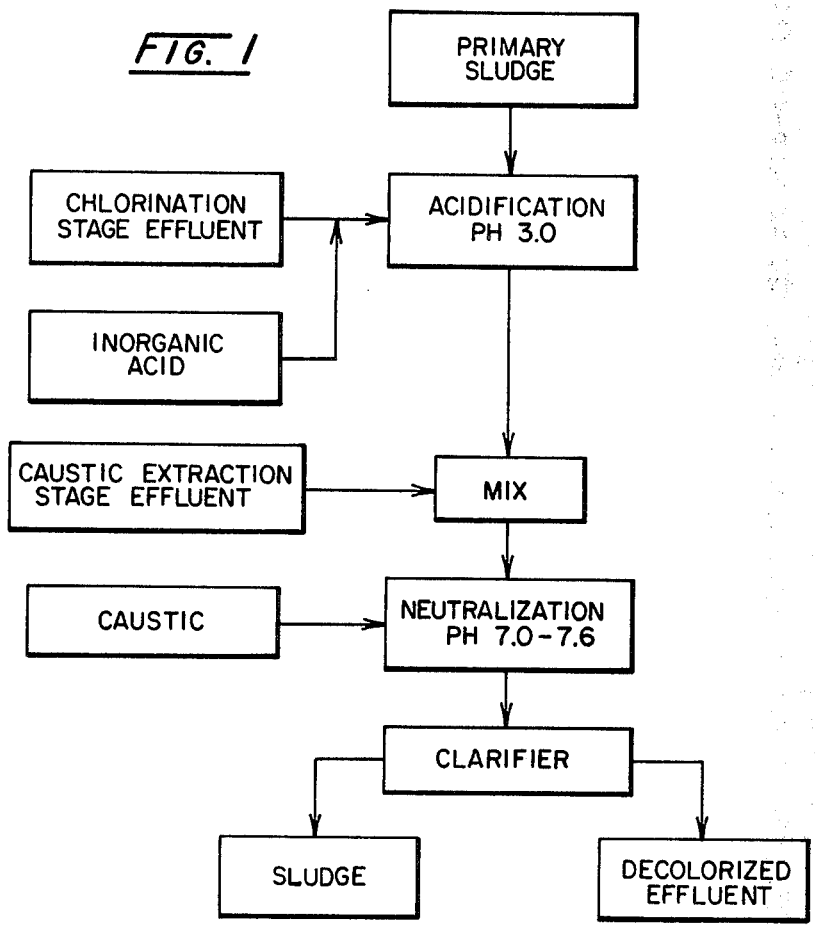
FIG. 1 is a flow diagram showing the stages in a preferred embodiment of the instant process.

The preferred mode of operation of the instant process is shown in FIG. 1. As shown in that figure, sludge from a pulp and paper mill is first acidified, preferably to about pH 3. This sludge is desirably pulp and paper mill primary sludge, used either alone or in combination with secondary or other sludge. The use of such pulp and paper mill sludge (rather than the synthetic chemicals or fly ash used in prior art processes) avoids transport costs, since the sludge is readily available in appropriate quantities on site. Our experiments have shown that, although the process will operate when the sludge is acidified to below pH 3, no benefits are gained by the use of the extra acid need to acidify below pH 3. The acidification of the sludge may be effected with a strong mineral acid (such as nitric, sulfuric or hydrochloric acid) but, to avoid excessive reagent costs, desirably at least part of the acidification is effected using the acid effluent from a chlorination stage of the pulp mill bleach plant.

The effect of the acidification step is to dissolve from the sludge aluminum, calcium and ferric cations. Our experiments, described in more detail below, have shown that it is the release of these cations from the sludge which is responsible for precipitation of the color in the later stages of the process. Furthermore, our experiments show that these three cations interact synergistically to effect optimum precipitation of the color from the caustic extraction effluent. Because it is vital that these three cations be extracted from the sludge, after acidification enough time should be allowed for the pH to stabilize and for the cations to be solubilized; in general, after acidification the sludge should be allowed to stand from about 20 to about 60 minutes before being used in the later stages of the instant processes.

We have found that most pulp and paper mill primary sludges contain sufficient quantities of these three cations to function satisfactorily in the instant process. However, if for any reason the sludge is deficient in one or more of these cations, additional quantities of the necessary cation(s) may be added to the sludge, in water-soluble or acid-soluble form, either before or after acidification of the sludge.

After the acidified sludge has been allowed to stand for the requisite time, it is mixed with the caustic extraction effluent to be decolorized. Commercial pulp mill bleach plants normally include several caustic extracting stages, and the instant process may be used to decolorize the effluent from any of these stages. However, by far the greater part of the colored material is found in the effluent from the first caustic extraction stage (the $E_1$ stage) of such plants, and thus the instant process is primarily intended for the decolorization of effluent from the first caustic extraction stage of such plants. Typically, the caustic extraction effluent is at about pH 10.0 to 11.5. It is not necessary to mix the acidified sludge and the caustic extraction effluent for protracted periods; we have found that normally mixing for about five minutes at 20° C. is sufficient, though longer times may be needed at lower temperatures. We prefer to use from about 10 to about 20 g. dry weight of sludge per liter of caustic extraction effluent; this results in a mixture having a final pH of about 4.0–6.0.

Although the main precipitation of the color does not occur until the subsequent neutralization stage of the instant process, in some cases a precipitate containing some colored material may be formed during the mixture of the acidified sludge and the caustic extraction effluent prior to neutralization. If such an acid-stage precipitate does form, we prefer to separate it from the accompanying liquor prior to neutralization.

In the next stage of the instant process, the mixture of sludge and effluent is raised to at least neutral pH and preferably to about pH 7.6. This neutralization stage causes the formation of a precipitate containing at least part of the colored material from the effluent; although the invention is in no way limited by this belief, we believe that the precipitation of the colored material is due to the formation of an insoluble complex between the lignin derivatives responsible for the color and the aluminum, calcium and ferric cations extracted from the sludge. This precipitate is then separated from the accompanying liquor; the separation may be effected in any convenient manner, such as by use of any of the conventional types of clarifiers used in prior art waste treatment plants.

EXPERIMENTAL RESULTS

Figure 2:
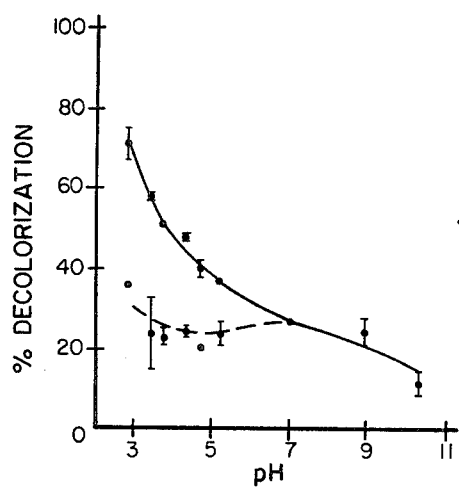
FIG. 2 is a graph showing the effect of the pH of the acidified sludge on color removal from effluent in the instant process.

FIG. 2 shows the results of experiments carried out to determine the optimum pH to which the sludge should be acidified in the instant process. Primary sludges were acidified to various pHs, mixed with a first caustic extraction stage effluent having a color value of 7374 National Council for Air and Stream Improvement (NCASI) units and incubated for two hours. The remaining color was then measured (as shown by the broken line in FIG. 2) and the pH of the mixture adjusted to 7.6. After the resultant precipitation had occurred, the remaining color was measured (as shown by the solid line in FIG. 2). It will be seen from FIG. 2 that the percentage of decolorization effected by the instant process increases steadily as the pH of the acidified sludge falls, until this pH reaches about 3. Further reduction in pH of the acidified sludge used in the instant process does not produce any substantial improvement in percentage decolorization, and the additional consumption of acid renders it uneconomical to use acidified sludge below about pH 3.

The ability of the instant process to use acidified sludge at a pH as high as 3 shows that the mode of action of the instant process is fundamentally different from the prior art acidification decolorization processes described above. In the prior art acidification decolorization processes, no appreciable precipitation of color occurs until the pH of the effluent is reduced to about 1.6–1.8.

Figure 3:
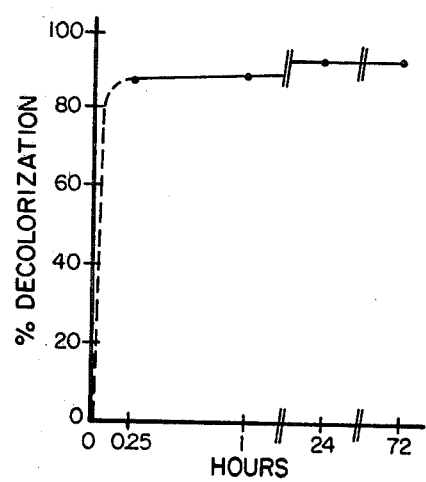
FIG. 3 is a graph showing the effect of incubating the mixture of acidified sludge and effluent produced in the instant process for various times prior to neutralization thereof.

FIG. 3 shows the results of tests to determine the length of time for which the acidified sludge and effluent should be mixed before neutralization. Acidified primary sludge, pH 3.0, was mixed with a first caustic extraction stage effluent having a color of 4906 NCASI units and the resultant mixture allowed to stand for varying periods, then neutralized to pH 7.6 and the percentage of decolorization measured. FIG. 3 shows that lengthy incubation of the mixture of sludge and effluent is not necessary; incubation for only 15 minutes gives results which are almost as good as those after protracted incubation period. Indeed, the reaction occurring at pH 3.0, which leads to eventual formation of the color precipitate, is so rapid that once the sludge is acidified and equalibriated at pH 3.0, it is not necessary to maintain this pH after mixing with the effluent; a sludge/effluent mixture in which the pH was not controlled and which consequently had a pH of 4–5 gave aubstantially the same results as a corresponding mixture which was held to a pH of 3.0 during the incubation period. Thus, the acidified sludge at pH 3.0 may be mixed with the effluent at its normal discharge pH of about 10–11 without deleterious effects on the instant process.

In view of the results shown in FIG. 3, in all the additional experiments described below an arbitrary incubation period of one hour was used for the mixing of the acidified sludge in effluent prior to neutralization.

To determine what components of the sludge were responsible for the precipitation of color, a sample of primary sludge was extracted at pH 3.0 for 24 hours, and the resultant liquor separated from the remaining insoluble material by filtration through a 0.7 μm. pore filter. A second sample of the primary sludge was ashed at 575° C. to determine if organic material was responsible for any of the color removal. A third sample of sludge was ashed in the same manner, then extracted in the same manner as the first sample. All three samples of trated sludge, and an untreated control sample of sludge, were then used in the process of the invention in the same manner as described above with reference to FIG. 3, using a one hour incubation time. Either 0.05 g. of the ashed sludge or the equivalent amount (0.16 g.) of non-ashed sludge was used per 10 ml. of first caustic extraction stage effluent having a color of 7545 NCASI units. The results are shown in Table 1 below.

TABLE 1

Color Removal From Effluent by Various Fractions of Primary Sludge

| Sludge Treatment | % Color Removal |
|---|---|
| Untreated | 75.0 |
| Extracted | 68.2 |
| Ashed | 73.4 |
| Ashed; then Extracted | 70.5 |

Table 1 shows that the acid extraction and the ashing procedures do not substantially change the percentage of color removal achieved. Accordingly, it is the acid-soluble, inorganic fraction of the sludge which is responsible for the color removal.

Since the untreated and ashed sludge gave essentially identical color removal results, for convenience the ashed sludge was used to determine the optimum ratio of sludge to effluent for maximum color reduction. Varying amounts of sludge ashed in the manner already described were acidified to pH 3.0 and added in varying amounts to 10 ml. aliquots of a first caustic extraction stage effluent having a color of 6525 NCASI units. The mixture of ashed sludge and effluent was incubated at one hour then neutralized to pH 7.6 and the percentage of color removal ascertained.

Figure 4:
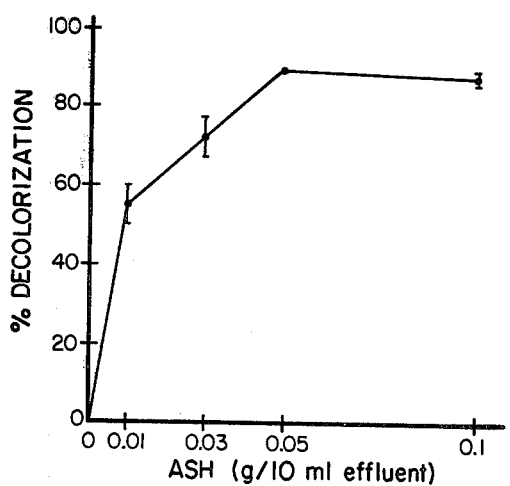
FIG. 4 is a graph showing the effect of using various quantities of sludge on color removal by the instant process.

As shown in FIG. 4, the greatest percentage of color precipitation was achieved at a ratio of 0.05 g. of ashed sludge (equivalent to 0.16 g. of whole sludge) per 10 ml. of effluent. At 0.01 g. ash per 10 ml of effluent, the amounts of soluble cations expressed in g. per liter were as follow: 0.004 Aluminum, 0.0007 ferric, 0.086 calcium.

To determine whether the decolorization results varied with the nature of the pulp mill sludge, sludges from four different mills were tested. Mill A is the sludge used in the previous experiments. Each sludge was tested for the proportion of ash remaining after ignition at 575° C.; the percentage ash given in Table 2 below is calculated as the amount after ignition 575° C. as a proportion of the weight of the sludge after drying at 105° C. The sludges were tested for their efficacy in color removal by the technique described above with reference to FIG. 4, 0.05 g. of ashed sludge being used per 10 ml. aliquot of a first caustic extraction stage effluent having a color of 7635 NCASI units. The results are shown in Table 2 below.

TABLE 2

Color Removal From $E_1$ Effluent by Pulp and Paper Mill Sludges

| Sludge | % Ash | % Color Removal |
|---|---|---|
| A | 31.8 | 75.9 |
| B | 27.9 | 20.8 |
| C | 54.1 | 73.7 |
| D-1 | 43.2 | 24.3 |
| D-2 | 38.3 | 50.7 |
| D-3 | 47.2 | 66.0 |
| D-2 (2 fold) | — | 55.7 |

Sludges A, B, C and D-1 were primary sludges from four different mills. As shown in Table 2, the color removal achieved varied considerably from a high of 76% to a low of 21%. Since the primary sludge D-1 performed poorly, another waste sludge (D-2) was obtained from mill D, this latter sludge being a combined sludge containing 40% Kraft primary sludge, 40% waste-activated sludge and 20% sulfite primary sludge. As shown in Table 2, sludge D-2 gave much better results than sludge D-1, achieving about 51% color removal. A doubling of the amount of sludge D-2 used (last line of Table 2) gave no substantial increase in color removal. Indeed, when experiments similar to those described above in relation to FIG. 4 were conducted using sludges from mills C and D to determine the optimum amount of ashed sludge to be used in the process, the optimum amount of ashed sludge was found to be the same as that from mill A, as determined from FIG. 4.

The aforementioned combined sludge was also obtained and tested some days later, and is denoted sludge D-3 in Table 2. Sludge D-3 removed almost as much color (66%) as the two best primary sludges. Thus, in using the instant process, the day-to-day variations in the composition of the sludge will have to be taken into account.

Data from each of the mills regarding the production of sludge and of first caustic extraction stage effluent indicated that in all cases the production of sludge was in excess of that required to treat the entire effluent stream.

Further experiments were then conducted to identify the components of the sludge responsible for the color removal in the instant process in order to make it possible to control problems of sludge variability and poor color removal in certain cases. After ashing by the technique already described, the primary sludges A, B and C and the combined sludge D-2 already described were analyzed for aluminum, calcium, iron, magnesium, potassium, sodium and titanium by neutron activation analysis. The results are shown in Table 3 below.

TABLE 3

Elemental Analysis of Primary Sludges from Four Pulp and Paper Mills

| | Primary Sludges (mg/g ash) | | | |
|---|---|---|---|---|
| Elements | A | B | C | D-2 |
| Aluminum | 74 | 108 | 26 | 97 |
| Calcium | 134 | 42 | 383 | 195 |
| Iron | 22 | 7 | 9 | 6 |
| Magnesium | 1 | 14 | 5 | 27 |
| Manganese | 3 | 0 | 1 | 1 |
| Potassium | 5 | 0 | 0 | 0 |
| Sodium | 8 | 9 | 10 | 4 |
| Titanium | 13 | 18 | 58 | 6 |

Calcium, aluminum, iron and titanium were consistently present in moderate to large amounts in the sludges. Since these elements are multivalent, they may all effect color precipitation to some degree if present in a soluble form. Accordingly, compounds of these four elements were added to a first caustic extraction stage effluent having a color of 7548 NCASI units; the amount used was equivalent to that which would be added by using ashed sludge A in the optimum amount for color removal. The results are shown in Table 4 below.

TABLE 4

Effect of Insoluble Salts on Color Removal from Effluent

| Salt | % Color Removal |
|---|---|
| Alumina ($Al_2O_3$) | 4 |
| Kaolin ($H_2Al_2Si_2O_8 \cdot H_2O$) | 9 |
| Silicic acid ($H_2SiO_3$) | 1 |
| Titanium dioxide ($TiO_2$) | 0 |
| Control (ashed sludge A) | 89 |

As might be expected, the insoluble oxides, alumina and titania had little or no effect on color removal. Accordingly, since the elemental analysis shown in Table 3 did not distinguish between acid-soluble and acid-insoluble forms of the elements, the ashed forms of the four sludges were extracted at pH 3.0 using the same technique as described above with reference to Table 1, and elemental analysis was performed by neutron activation on dry solids remaining after evaporation of these extracts. The results are shown in Table 5 below.

TABLE 5

Elemental Analysis of the Soluble Cation Content of Waste Sludges from Four Pulp and Paper Mills

| Soluble Elements | Sludges (mg/g ash) | | | |
|---|---|---|---|---|
| | A | B | C | D-2 |
| Aluminum | 4 | 4 | 5 | 3 |
| Calcium | 86 | 21 | 185 | 101 |
| Iron | 7 | nd | 3 | 4 |
| Magnesium | 0 | 4 | 0 | 15 |
| Manganese | 2 | 0 | 0 | 0 |
| Titanium | 0 | 0 | 0 | 0 |

The results in Table 5 show that the calcium is largely present in the sludges in acid-soluble form, but only limited amounts of aluminum and iron are present in acid-soluble form. As would be expected, none of the sludges showed any detectable amount of acid-soluble titanium, and indeed the complete absence of titanium from the residues verifies the effectiveness of the filtration used to separate the acid extract from the acid-insoluble residues.

To determine if the acid-soluble concentrations of aluminum, calcium and ferric ions shown by Table 5 to be present in the sludges were sufficient to cause the observed color precipitation, "synthetic sludges" were made up by dissolving the appropriate concentrations, as determined from Table 5, of one or more of the aluminum, calcium and ferric cations in water, the cations being used in the form of their chloride salts. These syntheitc sludge solutions were then tested for their ability to decolorize a first caustic extraction stage affluent having a color of 7650 NCASI units by the preferred form of the instant process already described. The results are shown in Table 6 below.

TABLE 6

Synergistic effects of Calcium (II), Iron (III) and Aluminum (III) Ions on Precipitation of Color of Effluent

| Mixture[a] | Components of mixture[b] | | | % Color removal |
|---|---|---|---|---|
| | $Al^{3+}$ | $Ca^{2+}$ | $Fe^{3+}$ | |
| Synthetic sludge C | .27 | 9.2 | .12 | 77 |
| | .27 | 9.2 | 0 | 68 |
| | .27 | 0 | .12 | 3 |
| | 0 | 9.2 | .12 | 57 |
| | .27 | 0 | 0 | 6 |
| | 0 | 9.2 | 0 | 39 |
| | 0 | 0 | .12 | −16 |
| Synthetic sludge A | .20 | 4.3 | .29 | 64 |
| Synthetic sludge D-2 | .15 | 5.1 | .19 | 50 |
| Control | 0 | 0 | 0 | 0 |

[a]Cation concentrations were based on the soluble cation content of the corresponding sludge as derived from (Table 5).
[b]Added as their chloride salts. (mg. element per 10 ml effluent)

The results in Table 6 show that the use of either calcium or aluminum alone resulted in some precipitation of color, but the combined removal of color by these two elements acting alone was much less than that achieved by the sludge. The use of ferric ion alone did not result in a filterable precipitate and in fact an increase in color was measured due to the formation of a highly colored iron:chromophore complex (see seventh line of Table 6). Only at much higher concentrations than those present in the sludge did ferric ion begin to cause precipitation of color.

The results in Table 6 show that aluminum, calcium and ferric cations act synergistically to cause color precipitation. Each pair of cations produces greater color precipitation than would be predicted by simple addition of the results obtained from each cation acting alone, and a further synergistic interaction is noted when all three cations are combined (compare the first line of Table 6 with the second, third and fourth lines thereof). The results achieved with the three-cation mixture are sufficient to explain all the observed color precipitation by Sludges C and D-2 and by far the greater part of the color precipitation caused by Sludge A.

Because sludge B was relatively inactive in color precipitation, no cation mixtures corresponding to this sludge were made up. Sludge B had only low levels of soluble calcium and to test whether this lack of soluble calcium was responsible for its relative inactivity, calcium chloride was added to sludge B to adjust the total calcium ion concentration to the same level as in sludge D. Although this calcium concentration, when used alone, gave only 8.5% color removal, the addition of this concentration of calcium to sludge B increased the color removal thereof from, 20.8% to 51.4%, thus showing that the relative inactivity of sludge B was largely due to its lack of calcium, and again illustrating the synergistic interactions between the three cations in color removal.

Because of the synergistic interaction among the three cations, only relatively low concentrations of each are required for color precipitation. Where a sludge is found to be relatively inactive in color precipitation because of a lack of one of the three elements, it is feasible to improve the color precipitation by that sludge by adding only small amounts of the one or more cations in which it is deficient.

One problem which may be encountered in practicing the instant process is that some pulp mill sludges contain large amounts of calcium carbonate or other alkaline materials, so that large amounts of acid are needed to acidify the sludge to about pH 3 in the first step of the instant process. For example, in the experiments described above the amount of acid required to adjust the sludge from mill C to pH 3.0 was actually more than would be required to precipitate the color from the first caustic extraction stage effluent with acid alone. Thus, if the acidification had to be conducted solely by the use of mineral acids, the economics of decolorization by acidified sludge would depend upon the acid consumption by a particular sludge. Fortunately, pulp mill bleach plant first chlorination stage effluent is stongly acid and can be used to effect much, if not all, of the necessary acidification of the sludge. The use of such chlorination stage effluent to acidify the sludge is particularly recommended where the sludge contains large quantities of calcium carbonate or similar alkaline materials which have very high acid consumptions. By the use of such chlorination stage effluence, the quantities of mineral acid needed in the instant process can be greatly reduced, thereby reducing the costs of the instant process.

Finally, a further series of experiments were conducted to show the effect of the pH of the acidified sludge on the color removal effected by the instant process. 10 ml aliquots of primary sludge from mill A each containing 0.7 g dry weight of sludge were acidified to pH 3.0 with 0.10 ml. of concentrated hydrochloric acid. In a first experiment, 40 ml. aliquots of first caustic extraction stage effluent from the bleach plant of mill D were acidified to pH 3.0 and mixed with the acidified sludge for 15 minutes. The mixture was neutralized to pH 7.6 and incubated for two hours, then clarified by filtration through a 0.7 μm. pore size Whatman GF/F glass fiber filter and the remaining color measured at 465 nm. using a 1 cm path length.

In a second experiment, the same acidified primary sludge was used to treat similar aliquots of unacidified effluent, which thus remain at its natural pH of 11.1.

In a third experiment, the acidification of both the primary sludge and the effluent was omitted, so that the sludge was used at its natural pH of 6.3 and the effluent at its natural pH of 11.1.

Finally, in a fourth experiment, the same amount of concentrated hydrochloric acid as previously used to acidify the primary sludge was added directly to the effluent mixed with 10 ml. of water, no sludge being used (the 10 ml. of water merely compensates for the volume change caused by the absence of the acidified sludge). After 15 minutes of incubation of this acidified mixture, the solution reached pH 2.5 but no precipitation of color occurred. The acidified effluent was then neutralized to pH 7.6, incubated for two hours, filtered, and its color measured as described above.

The effluent used in all the above experiments had a color of 5065 NCASI units.

The results of the above experiments are shown in Table 7 below.

TABLE 7

Color Removal Using Primary Sludge From Mill A

| Treatment | % Color Removal |
| --- | --- |
| Primary sludge, pH 3.0 plus effluent pH 3.0 | 66.0 |
| sludge pH 3.0, plus effluent pH 11.1 | 65.4 |
| sludge pH 6.3, plus effluent pH 11.1 | 38.1 |
| HCl, plus effluent pH 11.1 | 0.5 |

From the data shown in this table, it will be seen that although some color is removed without acidification of the sludge, for good results it is necessary to acidify the sludge to about pH 3.0. No substantial increase in color removal is effected by acidifying the effluent as well as the sludge, and in view of the extra costs associated with acidification of the effluent, we do not recommend this procedure. The results in Table 7 clearly show that the instant process is not an acidification decolorization process, since the quantity of acid used in insufficient to cause any significant decolorization of the effluent.

It will be apparent to those skilled in the art that numerous changes and modifications may be made in the instant process without departing from the scope of thereof. Accordingly, the foregoing description is to be construed in an illustrative and not in a limitative sense, the scope of the invention being defined by the appended claims.

What is claimed is:

1. A process for the decolorization of pulp mill bleach plant caustic extraction effluent comprising the steps wherein pulp and paper mill sludge containing aluminum, iron and calcium in acid-soluble form is acidified to an extent sufficient to dissolve from said sludge aluminum cations in an amount of at least about 0.004 grams per liter of said effluent to be decolorized, ferric cations in an amount of at least about 0.007 grams per liter of said effluent to be decolorized, and calcium cations in an amount of at least about 0.086 grams per liter of said effluent to be decolorized; said acidified sludge is mixed with said effluent; the resultant mixture of said acidified sludge and said effluent is raised to at least neutral pH, thereby forming a precipitate containing at least part of the colored material from said effluent; and said precipitate is separated from the accompanying liquor.

2. A process according to claim 1 wherein said sludge is selected from the group consisting of pulp and paper mill primary sludge and mixtures of pulp and paper mill primary sludge with other pulp and paper mill sludges.

3. A process according to claim 1 wherein at least part of said effluent comprises effluent from the first caustic extraction stage of a kraft bleach plant.

4. A process according to claim 1 wherein at least part of said acidification of said sludge is effected using an acid waste effluent from a paper mill bleach plant.

5. A process according to claim 4 wherein said acid waste effluent is chlorination stage effluent.

6. A process according to claim 1 wherein said mixing of said acidified sludge with said effluent produces an acid-stage precipitate and wherein at least part of said acid-stage precipitate is separated from the accompanying liquor prior to said neutralization.

7. A process according to claim 1 wherein said sludge is acidified to about pH 3.

8. A process according to claim 1 wherein said at least neutral pH to which said mixture is raised is about pH 7.6.

9. A process according to claim 1 wherein at least one of the cations aluminum, calcium and ferric iron is added, in a water-soluble or acid-soluble form, to said sludge prior to said admixture thereof with said effluent.

10. A process according to claim 1 wherein said pulp and paper mill sludge is incubated with acid for a period of from about 20 to about 60 minutes before being added to said effluent.

* * * * *